United States Patent Office 3,170,059
Patented Feb. 16, 1965

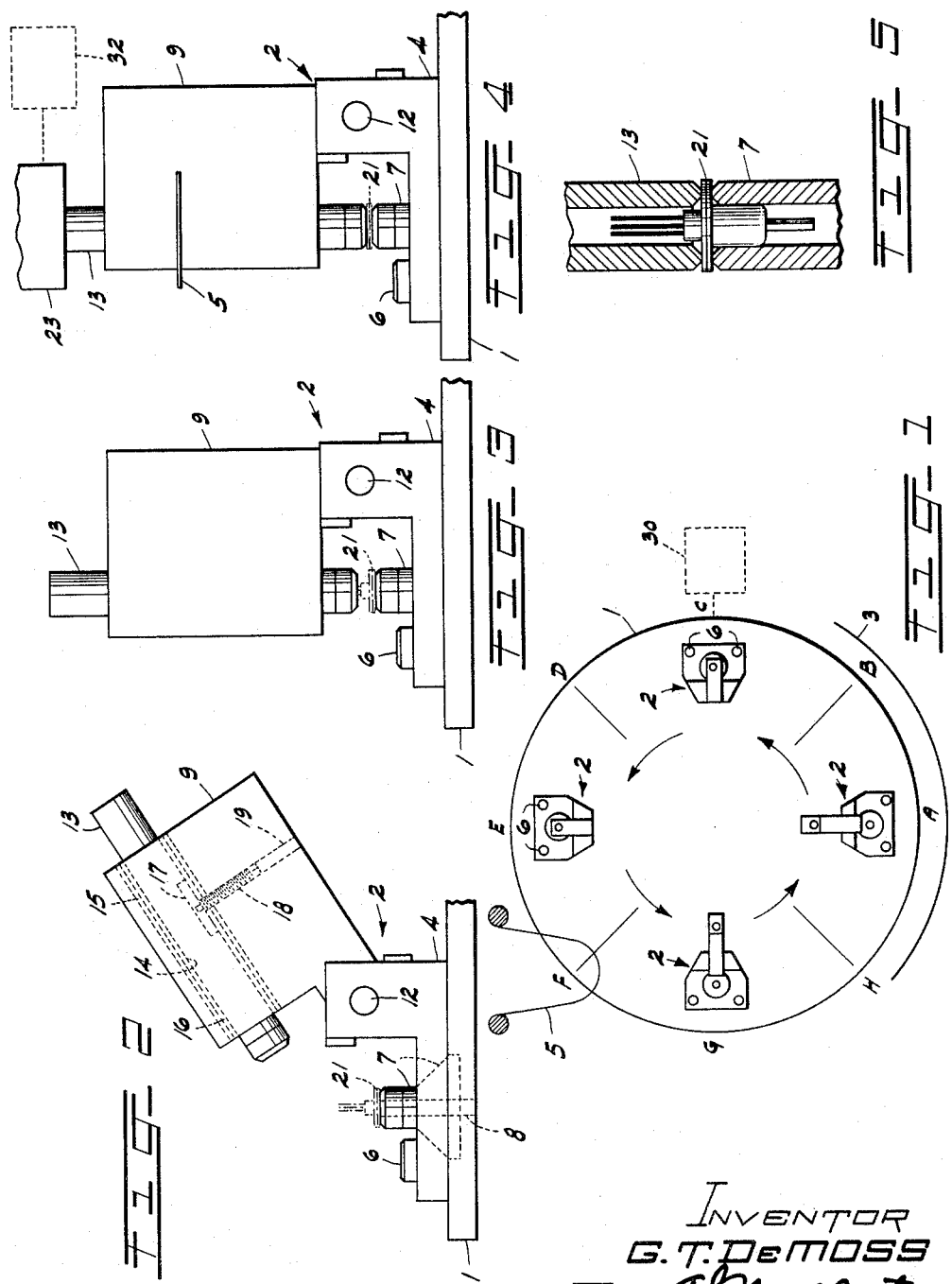

3,170,059
WELDING APPARATUS
George T. De Moss, Wyomissing, Pa., assignor to Western Electric Company, Incorporated, a corporation of New York
Filed Oct. 4, 1961, Ser. No. 142,916
5 Claims. (Cl. 219—80)

This invention relates to apparatus for welding articles and, more particularly, to apparatus for welding transistor cans to transistor headers.

Prior to the invention, the process of transistor can to header welding has proven considerably time consuming in that a single manually loaded and unloaded welding unit was utilized, necessitating a forced idleness of the operator during the actual welding, with correspondingly low output.

It is, accordingly, an object of this invention to greatly increase the output of a welding operation of this nature by providing a plurality of continuously operating units and various means to enable the semiautomatic operation thereof.

It is a further object of this invention to provide semiautomatic apparatus for welding articles which is readily adaptable, through the incorporation therein of relatively minor and well-known modifications, to fully automatic operation as an integrated part of an automated manufacturing process.

Another object of the invention is the provision of the advantages set forth herein-above without any reduction in the quality of the finished product.

In a preferred embodiment herein-disclosed the invention generally comprises a turntable, indexable to a plurality of stations and upon which are mounted, in diametrically opposed positions, a plurality of identical welding units operative to weld articles at at least one of such table stations. In operation, each of the welding units is manually loaded with an article as it passes an operator and thence functions to automatically weld and eject the articles to repass the operator in an unloaded condition for reloading and repetition of the welding cycle.

The invention and the advantages thereof may be more readily understood by specific reference to the accompanying drawings wherein:

FIG. 1 is a top view of the welding apparatus of the instant invention;

FIGS. 2, 3, and 4 illustrate one of the turntable mounted welding units at various turntable stations during the welding operation.

FIG. 5 is a vertical cross section of the upper and lower welding unit electrodes in position to weld, and includes the depiction of a transistor can-header assembly positioned therebetween.

Referring now to FIG. 1 of the drawings, the welding apparatus is seen to comprise a turntable 1 indexable to a plurality of stations by control means 30 and upon which are mounted, in diametrically opposed positions, a plurality of electrical welding units 2. The letters A to H are utilized in this figure to indicate the stations to which the turntable is indexed during one complete revolution thereof, the operations performed by the welding apparatus or operator at each of such stations being set forth in detail herein-below. A flat spring 5 is fixedly mounted adjacent the turntable and positioned as shown (see also FIG. 4) to abut the welding unit as the latter is indexed from station E to station F.

As should be noted, eight separate stations are indicated although only four welding units are depicted on the turntable surface. The reason for this resides in the contemplation of the utilization of eight welding units instead of four to thus double the output of the apparatus at any given speed of operation. This would, of course, be a logical step in incorporating the instant device for utilization in a fully automated manufacturing process wherein the maximum rate at which an operator can manually load and close the welding units in an effective manner would be of no significance. In any event, the time consuming nature of the delay occasioned by indexing the turntable to four excess stations is neatly eliminated by operating the device at the maximum possible rate compatible with the skill of the operator. Arcuate line 3 indicates, in a general manner, the approximate range over which the operator's hands travel during the welding operation.

FIGURES 2, 3 and 4 reveal each of the welding units to comprise a lower electrode support member 4 mounted on the surface of the turntable by two mounting screws 6. Hollow lower electrode 7 is seen to be mounted within and contact the turntable and extend upwardly therefrom through the support member 4. Thus, the turntable is enabled to function as a circuit path to the lower electrode for the electrical welding operation. A hole 8 is drilled in the lower surface of the turntable and communicates with the interior of the hollow lower electrode for purposes of ejecting a welding transistor therefrom as is set forth in greater detail herein-below.

Upper electrode support member 9 is pivotally mounted on the electrode support member 4 by pivot pin 12 extending therethrough. Hollow upper electrode 13 is slidably mounted within bore 14 in the upper electrode support member and electrically insulated therefrom by a sleeve 15 of dielectric material positioned therebetween and attached to the wall of bore 14. Additionally, a bearing sleeve 16 is mounted between the upper electrode and the dielectric sleeve and attached to the latter, thus enabling the upper electrode to slide freely within the upper electrode support member and yet be electrically insulated therefrom. In order to limit the extent to which the upper electrode can slide and thus retain same in the support member, a keyway 17 is formed in the electrode to cooperate with a key 18 of dielectric material, which key extends through bore 19 in the upper electrode support member to the interior of such keyway. Transistor can-header assembly 21 is depicted in FIG. 2 in the position occupied thereby in the welding units of the invention when the latter are at stations C, D, and E.

Upper welder contact 23 (FIG. 4) is reciprocatably mounted above the turntable at station E and automatically moved downward by control means 32 into firm contact with the top surface of an upper electrode every time a welding unit is indexed to such station, thus forcing the upper electrode firmly against the transistor can-header assembly to complete the welding pressure and electrical contact.

FIG. 5 includes a more detailed illustration of the position of the upper and lower electrodes and the transistor can-header assembly at the time the welding unit has assumed the position shown in FIG. 4.

In operation, the welding apparatus is turned on and the operator commences to manually load a transistor can-header assembly into the lower electrode of the welding unit just indexed, in the open position of FIG. 2, to station H. The manual loading operation continues until this unit has indexed from station H through stations A and B to station C, at which time the loading operation has been completed and the welding unit manually closed to the position of FIG. 3. The unit is then indexed through station D to station E whereat the upper welder contact 23 is automatically brought into engagement with the upper electrode to force the latter to the position depicted in FIG. 5 and complete the welding circuit to perform the welding operation.

At the completion of the actual welding, the welding unit is indexed from station E to station F with the flat spring 5 (FIGS. 1 and 4) functioning to abut the pivotally mounted upper electrode support member and force same to the open position of FIG. 2 once again. The unit is thence indexed to station G whereat a blast of compressed air from any convenient source (not shown) is introduced to the bottom of hole 8 to travel therethrough and through the communicating interior of the hollow lower electrode to impinge upon the welded transistor, thereby ejecting same from the welding unit. At this point, any one of a wide variety of well-known methods, as for example baffle or guide tube means (none of which are illustrated) may be utilized to collect the completed transistors for further processing or testing.

The last step in the cycle then occurs with the open, and empty, welding unit being indexed again to station H whereat the repetition of the insertion, close, weld, open, and eject cycle is commenced. It is, of course, to be clearly understood that the above-described cycle occurs four times—once for each welding unit—for every complete revolution of the turntable once the initial loading of the four welding units has been completed. Herein resides one of the important advantages of the instant invention in that the operator, after having loaded and closed a welding unit, need not sit idly by and await the completion of the welding operation, but rather, is productively engaged in loading and closing the following three units.

Various changes and modifications may obviously be made in the instant invention without departing from the spirit and scope thereof. For example, automatic means such as a vibratory feeder may be employed to load the transistor can-header assemblies into the lower electrodes and a second flat spring employed between stations B and E to automatically close the welding units, thus eliminating the necessity for an operator. Also, as is set forth hereinabove, eight welding units may be mounted upon the surface of the turntable, one at each of the stations, thus doubling the output of the apparatus for any given speed of the turntable.

What is claimed is:

1. Welding apparatus for welding transistor can-header assemblies comprising a turntable indexable to a plurality of positions, a plurality of pairs of electrode support members mounted thereon, with one support member of each said pair being pivotally mounted with respect to the other, a hollow electrode mounted within each of the electrode support members so as to enable the insertion of a transistor can-header assembly between the electrodes of each said pair of electrode support members, and means cooperatively associated with the turntable to successively energize the electrodes mounted within each said pair of electrode support members and eject welded transistor can-header assemblies therefrom.

2. In a welding apparatus wherein articles to be welded are continuously inserted into, welded by, and ejected from a plurality of welding units, a pivotally mounted electrode support member pivotal to at least two positions, an electrode slidably mounted therein, and a welder contact reciprocably mounted above the support member and operative to contact and slide the electrode therewithin when the support member has assumed one of said two positions.

3. In a welding apparatus wherein articles to be welded are continuously inserted into, welded by, and ejected from a plurality of welding units, an electrode assembly comprising a pivotally mounted electrode support member with a bore extending therethrough, a sleeve of dielectric material fixedly supported within said bore, a sleeve of bearing material fixedly supported within said first-mentioned sleeve, an electrode slidably mounted within said bearing sleeve and having a keyway formed therein, a second bore in the support member extending to the interior of the first-mentioned bore and a key of dielectric material mounted within said second bore and extending therethrough and into the keyway formed in the electrode to thus limit the extent to which such electrode can slide in the support member.

4. In a welding apparatus, a plurality of welding units, each of which comprises, first and second supports and first and second electrodes mounted respectively within said first and second supports such that at least one of said electrodes is slidable within its support, said second support being mounted on said first support so as to be movable to at least two positions relative thereto, in one of said positions said electrodes being misaligned and spaced apart by an amount sufficient to permit the insertion of an article to be welded therebetween, and in the other of said positions said electrodes being aligned and adapted to mutually contact an article to be welded and positioned therebetween.

5. In a welding apparatus, a plurality of welding units, each of which comprises, first and second supports and first and second electrodes, at least one of which is hollow, mounted respectively within said first and second supports, said second support being pivotally mounted on said first support so as to be movable to at least two positions relative thereto, in one of said positions said electrodes being misaligned and spaced apart by an amount sufficient to permit the insertion of an article to be welded therebetween, and in the other of said positions said electrodes being aligned and adapted to mutually contact an article to be welded and positioned therebetween.

References Cited in the file of this patent

UNITED STATES PATENTS

| | | |
|---|---|---|
| 1,066,726 | Gravell | July 8, 1913 |
| 1,665,038 | Meadowcroft | Apr. 3, 1928 |
| 2,007,698 | Tear | July 9, 1935 |
| 2,052,356 | Long | Aug. 25, 1936 |
| 2,330,658 | Albright | Sept. 28, 1943 |
| 2,338,002 | Mero | Dec. 28, 1943 |
| 2,376,692 | Heim | May 22, 1945 |